(12) United States Patent
Hatakeyama (10) Patent No.: US 8,065,526 B2
(45) Date of Patent: Nov. 22, 2011

(54) METHODS AND APPARATUS FOR CONTENT CONTROL USING PROCESSOR RESOURCE MANAGEMENT

(75) Inventor: Akiyuki Hatakeyama, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 976 days.

(21) Appl. No.: 11/347,068

(22) Filed: Feb. 3, 2006

(65) Prior Publication Data

US 2007/0180249 A1    Aug. 2, 2007

Related U.S. Application Data

(60) Provisional application No. 60/650,665, filed on Feb. 7, 2005.

(51) Int. Cl.
*H04L 29/00* (2006.01)
(52) U.S. Cl. ........................................ 713/176; 713/180
(58) Field of Classification Search .................. 713/176, 713/180
See application file for complete search history.

(56) References Cited

U.S. PATENT DOCUMENTS

| 6,237,786 | B1 | 5/2001 | Ginter |
| 6,398,245 | B1* | 6/2002 | Gruse et al. ................... 713/176 |
| 7,155,419 | B2* | 12/2006 | Blackman et al. ............... 705/80 |
| 7,174,457 | B1* | 2/2007 | England et al. ............... 713/168 |
| 2002/0091931 | A1 | 7/2002 | Quick, Jr. |
| 2002/0169986 | A1 | 11/2002 | Lortz |
| 2003/0014503 | A1 | 1/2003 | Legout et al. |
| 2003/0028794 | A1 | 2/2003 | Miller |
| 2003/0185399 | A1* | 10/2003 | Ishiguro ......................... 380/281 |
| 2004/0047354 | A1* | 3/2004 | Slater et al. .................... 370/400 |
| 2004/0184616 | A1 | 9/2004 | Morten |
| 2005/0074121 | A1* | 4/2005 | Miura ............................ 380/255 |
| 2006/0005256 | A1* | 1/2006 | Cox ................................ 726/27 |

FOREIGN PATENT DOCUMENTS

| EP | 1 132 796 A1 | 9/2001 |
| EP | 1132796 A1 | 12/2001 |
| JP | 2002353953 | 6/2002 |
| JP | 2003122724 | 4/2003 |
| TW | 576070 | 2/2004 |

(Continued)

OTHER PUBLICATIONS

Office Action for corresponding Taiwan Patent Application No. 095104105.

(Continued)

*Primary Examiner* — Vivek Srivastava
*Assistant Examiner* — Anthony Brown
(74) *Attorney, Agent, or Firm* — Matthew B. Dernier, Esq.; Gibson & Dernier LLP (57) ABSTRACT

Methods and apparatus provide for: requiring that a content provider seeking to have its content executed by a processing system enter into an accord with a processing system provider; receiving a second key and a digital signature from the content provider to the processing system provider, the second key being operable to decrypt the content when it has been encrypted with a first key, and the digital signature indicating that the accord has been reached; receiving the encrypted content from the content provider in a memory of the processing system; and preventing use of one or more processing resources of the processing system that are otherwise operable to facilitate the execution of the content unless the digital signature is received from the processing system provider.

37 Claims, 6 Drawing Sheets

FOREIGN PATENT DOCUMENTS

| TW | 1223949 | | 11/2004 | |
|---|---|---|---|---|
| WO | WO 2004/095797 | * | 4/2003 | ............... 726/26 |
| WO | 2004072787 A2 | | 8/2004 | |
| WO | WO 2004/072787 A2 | | 8/2004 | |
| WO | 2005008454 A1 | | 1/2005 | |

OTHER PUBLICATIONS

Office Action for corresponding Japanese Patent Application No. 2006-020409, dated Jun. 16, 2009.

International Search Report and Written Opinion based on PCT/JP2006/302206, dated Aug. 7, 2006, 12 pgs.

Schneier B.; "Applied Cryptography, Second Edition;" Applied Cryptography. Protocols, Algorithms, and Source Code in C; John Wiley & Sons, NY; 1996; XP002236553; pp. 31-42.

Berg, Cliff; "How Do I Create a Signed Applet?;" Dr. Dobb's Journal; M&T Publ., Redwood City, CA; vol. 22, No. 8; Aug. 1997; XP002140406; pp. 109-111, 122-123.

International Search Report and Written Opinion based on PCT/JP2006/302206, dated Aug. 7, 2006, 12 pgs.

Schneier B.; "Applied Cryptography, Second Edition;" Applied Cryptography. Protocols, Algorithms, and Source Code in C; John Wiley & Sons, NY; 1996; XP002236553; pp. 31-42.

Gong et al.; "Going Beyond the Sandbox: An Overview of the New Security Architecture in Java™ Development Kit 1.2;" Proceedings of the Usenix Symposium on Internet Technologies and Systems; Dec. 1997; XP002250254; pp. 1-10.

Berg, Cliff; "How Do I Create a Signed Applet?;" Dr. Dobb's Journal; M&T Publ., Redwood City, CA; vol. 22, No. 8; Aug. 1997; XP002140406; pp. 109-111, 122-123.

* cited by examiner

METHODS AND APPARATUS FOR CONTENT CONTROL USING PROCESSOR RESOURCE MANAGEMENT

CROSS REFERENCE TO RELATED APPLICATION

This application claims the benefit of U.S. Provisional Patent Application No. 60/650,665, filed Feb. 7, 2005, entitled "Methods And Apparatus For Content Control Using Processor Resource Management," the entire disclosure of which is hereby incorporated by reference.

BACKGROUND OF THE INVENTION

The present invention relates to methods and apparatus for managing processing resources in a processing system to achieve control of content distribution and/or execution on the processing system and to achieve desirable commercial objectives.

In recent years, there has been an insatiable desire for faster computer processing data throughputs because cutting-edge computer applications are becoming more and more complex, and are placing ever increasing demands on processing systems. Graphics applications are among those that place the highest demands on a processing system because they require such vast numbers of data accesses, data computations, and data manipulations in relatively short periods of time to achieve desirable visual results.

Designers and manufacturers of processing systems are meeting the challenge to achieve faster processing speeds such that more and more complex software applications may be executed. A conventional business model dictates that the designer/manufacturer of the processing system may obtain a price commensurate with the capabilities of the system from a user seeking to purchase the processing system and execute content (e.g., programs) thereon. The conventional business model also dictates that the content may be developed by a third party or by the designer/manufacturer of the processing system. The designer/manufacturer may also license the third party to develop content for execution on the processing system.

Depending on the processing system architecture and the operating system running thereon, conventional business models and processing system designs cannot guarantee that a third party can be prevented from developing content for execution on the processing system unless a license or other form of compensation is obtained. For example, it may be desirable to have an open system architecture (hardware and software) in order to encourage the development of newer and more advanced content for enjoyment by the user. Unfortunately, an open system architecture does not provide many opportunities for controlling the execution of the content oh the processing system by the designer/manufacturer. Thus, the designer/manufacturer may find it difficult to share in the profits of content sales.

One approach to permitting the designer/manufacturer to share in the profits of content sales is disclosed in co-pending U.S. Patent Application No. 60/650,750, filed Feb. 7, 2005, entitled METHODS AND APPARATUS FOR RESOURCE MANAGEMENT IN A PROCESSOR, (further reference number SC04023US00), the entire disclosure of which is hereby incorporated by reference. This approach provides a processing system in which the ability of an application program to utilize the resources of the processing system are strictly regulated by the operating system of the processing system. Content providers (such as game developers, etc.) purchase the ability to use certain resources of the processing system upon which they wish to have their content executed. (Some of the resources of a processing system, such as a video game console, include a disc controller (CD, DVD, etc.), graphics chips, hard disc (HD) components, tuner circuitry, network interface circuitry, etc.) The purchase may take on many different forms, such as a one-time payment, a royalty-based payment schedule, etc. The usage may be unlimited or time limited.

The regulation of access to the resources of the processing system may be achieved by requiring the presentation of usage information, such as an authentication code and/or digital signature to the processing system. In return for payment, an authorizing entity (such as the designer/manufacturer of the processing system) may provide a private key of a private/public key pair to the content provider. The provider may run a known hash algorithm on the content to get a hash result and then encrypt the content and the hash result. As the operating system of the processing system may readily control whether certain resources are enabled to a program, the processing system may prevent the content from using certain resources unless: (1) the content and the hash result can be decrypted using the public key of the private/public key pair, and (2) the hash result matches an independently run hash of the content.

Although the above approach addresses the issue of permitting the designer/manufacturer to share in the profits of content sales, it has the consequence of preventing the user from executing shareware and freeware on the processing system. Indeed, providers of shareware and freeware are not likely to be in a position to purchase the ability to utilize the processing resources of a processing system from the designer/manufacturer. Thus, the user will be foreclosed from executing many shareware and/or freeware programs on the processing system.

Accordingly, there are needs in the art for new methods and apparatus for managing processing resources in a processing system such that the advantages of an open system architecture may be realized, the designer/manufacturer of the processing system may share in the rewards of content development and sales, and the user may enjoy the benefits of executing shareware and freeware programs on the processing system.

SUMMARY OF THE INVENTION

Aspects of the invention are directed to methods and apparatus in which any software requiring use of some or all of the resources of a processing system must have been approved (e.g., by a digital signature) by an entity associated with the processing system (e.g., the designer and/or the manufacturer). The ability of an application program to utilize the resources of the processing system is strictly regulated by the operating system of the processing system in order to achieve desirable business goals. Aspects of the invention provide a mechanism that enables the providers of freeware, shareware, and (unlicensed) game content to obtain or validate a digital signature vis-à-vis the designer/manufacturer of the processing system in order to gain access to the resources necessary to execute the content.

In accordance with aspects of the invention, the content providers register for and/or purchase the ability to use certain resources of the processing system upon which they wish to have their content executed. The permitted usage of the processing resources may be unlimited or limited.

The regulation of access to the resources of the processing system may be achieved by requiring the presentation of usage information, such as an authentication code and/or digital signature to the processing system. In return for registration and/or payment, an authorizing entity (such as the designer/manufacturer) may electronically sign or otherwise validate some indicia from the content provider to authenticate the content (and/or the content provider) and authorize the usage of the resources of the processing system.

More particularly, the content provider produces some indicia specific to the content (such as a hash result). The content provider encrypts the content using the content provider's private key of a first private/public key pair. The content provider gives the hash result and the content provider's public key to the manufacturer of the processing system. The designer/manufacturer of the processing system verifies the registration agreement and encrypts at least the hash result (and possibly the content provider's public key) using the manufacturer's private key of a second private/public key pair. The user receives the encrypted content, the encrypted (signed) hash result, and the content provider's public key. The processing system has the manufacturer's public key stored locally during manufacture. The hash algorithm is either stored locally during manufacture or provided to the processing system in a secure fashion (such as with the hash result or by way of separate transmission). Thus, the processing system can decrypt the hash result and use the content provider's public key to decrypt the content. The processing system may also cross-check the hash result to verify the source of the content. Finally, the results of the decryption and cross-checking may permit access to the resources of the processing system by the content.

In order to ensure that the operating system of the processing system may not be tampered with during the regulation of resources, the processing system is preferably operable to enter a secure mode before the content verification process proceeds.

In accordance with one or more further aspects of the present invention, methods and apparatus provide for: requiring that a content provider seeking to have its content executed by a processing system enter into an accord with a processing system provider; receiving a second key and a digital signature from the content provider to the processing system provider, the second key being operable to decrypt the content when it has been encrypted with a first key, and the digital signature indicating that the accord has been reached; receiving the encrypted content from the content provider in a memory of the processing system; and preventing use of one or more processing resources of the processing system that are otherwise operable to facilitate the execution of the content unless the digital signature is received from the processing system provider.

The methods and apparatus may also provide for: encrypting at least the digital signature using a third key; ensuring that a fourth key is available to the processing system that is operable to decrypt the digital signature; and making the second key and encrypted digital signature available to the processing system. Still further the methods and apparatus may provide for: decrypting at least the encrypted digital signature using the fourth key; checking authenticity of the digital signature; and permitting use of the one or more processing resources if the digital signature is authentic.

Preferably, the first key is a private key of a first public/private key pair that controlled by the content provider irrespective of the accord; and the second key is preferably a public key of the first public/private key pair. The third key is preferably a private key of a second public/private key pair that controlled by the processing system provider; and the fourth key is preferably a public key of the second public/private key pair.

The digital signature may be a hash result obtained by running a hash algorithm on at least some of the content, and the content provider may make at least one of the hash result and the hash algorithm known to the processing system provider. The processing system provider may make the hash algorithm available to the processing system. The function of checking the authenticity of the digital signature may include running the hash algorithm on the at least some of the content to obtain a second hash result and comparing the digital signature to the second hash result.

The content may include a resource list that identifies which of the processing resources are permitted to be used by the content.

The methods and apparatus may also provide for: permitting execution of at least some of the content despite the absence of the authorized digital signature; and permitting use of at least one of the processing resources despite the absence of the authorized digital signature.

By way of example, the processing resources may include a non-volatile memory sub-system, and one or more functional circuits of the processing system. The non-volatile memory sub-system may include at least portions of software and/or hardware components of an electromagnetic memory medium, an electronic memory medium, a silicon memory medium, an optical memory medium, a hard disc memory medium, a CD-ROM memory medium, a DVD-ROM memory medium, and an external memory medium. The one or more functional circuits of the apparatus may include at least one graphics processing circuit, a network interface circuit, a display interface circuit, a printer interface circuit, and a local data input and/or output interface.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PRESENT INVENTION

Figure 1:
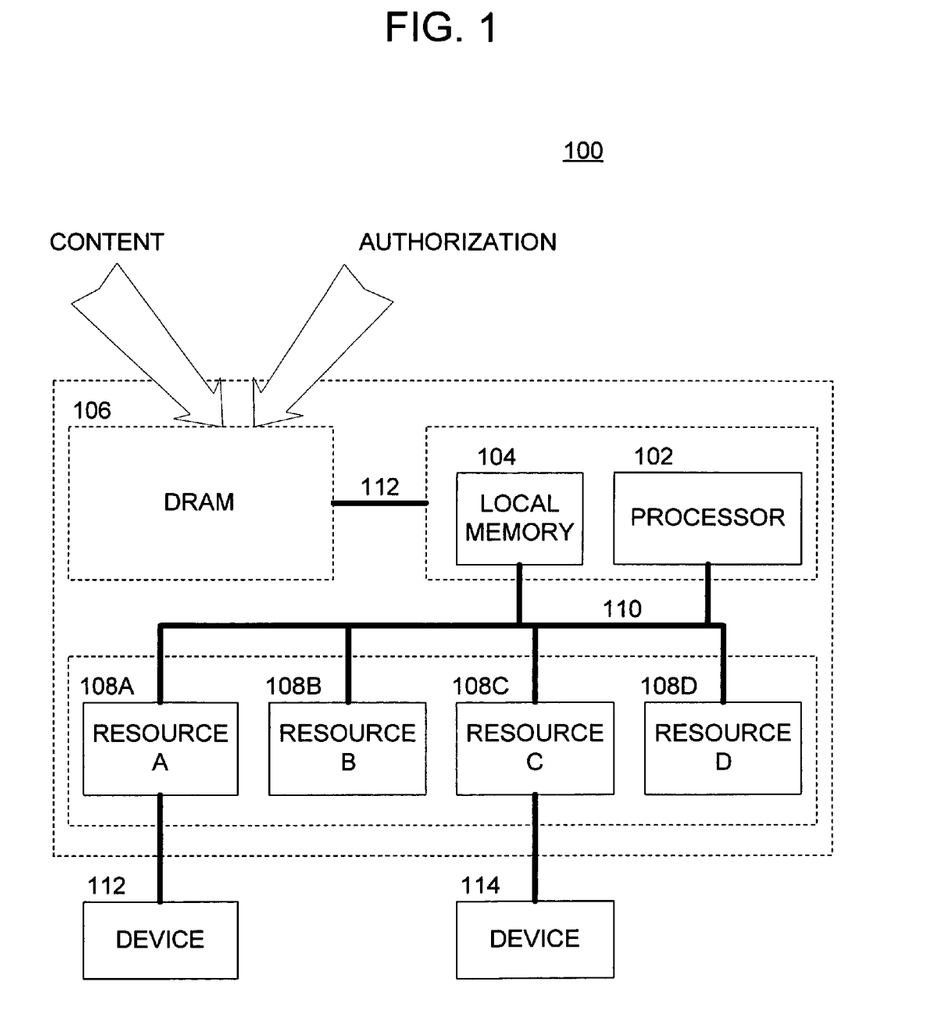
FIG. 1 is a block diagram illustrating a processing system in accordance with one or more aspects of the present invention.

With reference to the drawings, wherein like numerals indicate like elements, there is shown in FIG. 1 a processing system 100 suitable for employing one or more aspects of the present invention. For the purposes of brevity and clarity, the block diagram of FIG. 1 will be referred to and described herein as illustrating an apparatus 100, it being understood, however, that the description may readily be applied to various aspects of a method with equal force. The apparatus 100 preferably includes a processor 102, a local memory 104, a system memory 106 (e.g., a DRAM), and a bus 112 interconnecting same.

The system memory 106 may receive content, such as program code, data, and/or other content species known in the art, for execution by the processor 102. For example, the processor 102 may cause at least some of the content to be stored within the local memory 104 and then executed in order to achieve a desired result. Herein, execution of the content may entail executing program instructions, manipulating program code and/or data, using data in some way (such as playing streaming video data, storing data in a memory, etc.), and/or any other processing of the content. The processor 102 may be implemented utilizing any of the known technologies that are capable of requesting data from the system memory 106, and manipulating the data to achieve a desirable result. For example, the processor 102 may be implemented using any of the known microprocessors that are capable of executing software and/or firmware, including standard microprocessors, distributed microprocessors, etc. By way of example, the processor 102 may be a graphics processor that is capable of requesting and manipulating data, such as pixel data, including gray scale information, color information, texture data, polygonal information, video frame information, etc.

Preferably, the local memory 104 is located in the same chip as the processor 102 and, thus, the combination of the processor 102 and the memory 104 may be referred to herein as "the processor." As on-chip space is often limited, the size of the local memory 104 may be much smaller than the system memory 106. The processor 102 preferably provides data access requests to copy data (which may include program data) from the system memory 106 over the bus 112 into the local memory 104 for program execution and data manipulation. The mechanism for facilitating data access may be implemented utilizing any of the known techniques, such as direct memory access (DMA) techniques.

The apparatus 100 also preferably includes a plurality of processing resources 108, such as resource 108A, resource 108B, resource 108C, resource 108D, etc. These resources may assist the processor 102 in carrying out useful tasks in association with executing the program code. By way of example, the processing resources 108 may include a sub-system of the apparatus 100, such as a non-volatile memory. Examples of non-volatile memory sub-systems include hardware and/or software components of an electromagnetic memory medium (e.g., a floppy disk, a hard disk, etc.), an electronic memory medium (e.g., a programmable read only memory, an EE programmable read only memory, etc.), a silicon memory medium (e.g., a Memory Stick, etc.), an optical memory medium (e.g., a CD-ROM, a DVD-ROM, etc.), an external memory, etc. The resources 108 may also include functional circuits of the apparatus 100, such as a graphics processing circuit, a network interface circuit, a display interface circuit, a printer interface circuit, a local data input and/or output interface, etc. Thus, some of the processing resources 108 may be associated with external devices 114, 116, such as a display screen, a printer, etc. It is noted that although the processing resources 108 are illustrated as being outside of the functional boundary circumscribing the processor 102 and the local memory 104, it is to be understood that the processing resources 108 may be inside or outside such boundary without departing from the various embodiments of the invention.

The apparatus 100 is preferably operable to restrict or regulate the ability of an application program (containing some program code) from utilizing one or more of the programming resources during execution. In particular, the operating system of the processor 102 is preferably operable to prevent the use of one or more of the processing resources 108 that are otherwise operable to facilitate the execution of the program code unless an authorized digital signature is associated with the content. Preferably, the authorized digital signature may only be obtained from (or validated by) an authorized entity, such as the designer and/or manufacturer of the apparatus 100. For example, the apparatus 100 may be capable of executing video game software and a game developer (content provider) may seek to have its game software executed on the apparatus 100. By requiring that the content include an authorized digital signature, the designer/manufacturer of the apparatus 100 may participate in the sale of the content to the user of the apparatus 100. Further the content provider may wish to distribute shareware and/or freeware program content for execution on the apparatus 100. Various aspects of the present invention also permit that an authorized digital signature be associated with the shareware and freeware.

Figure 2:
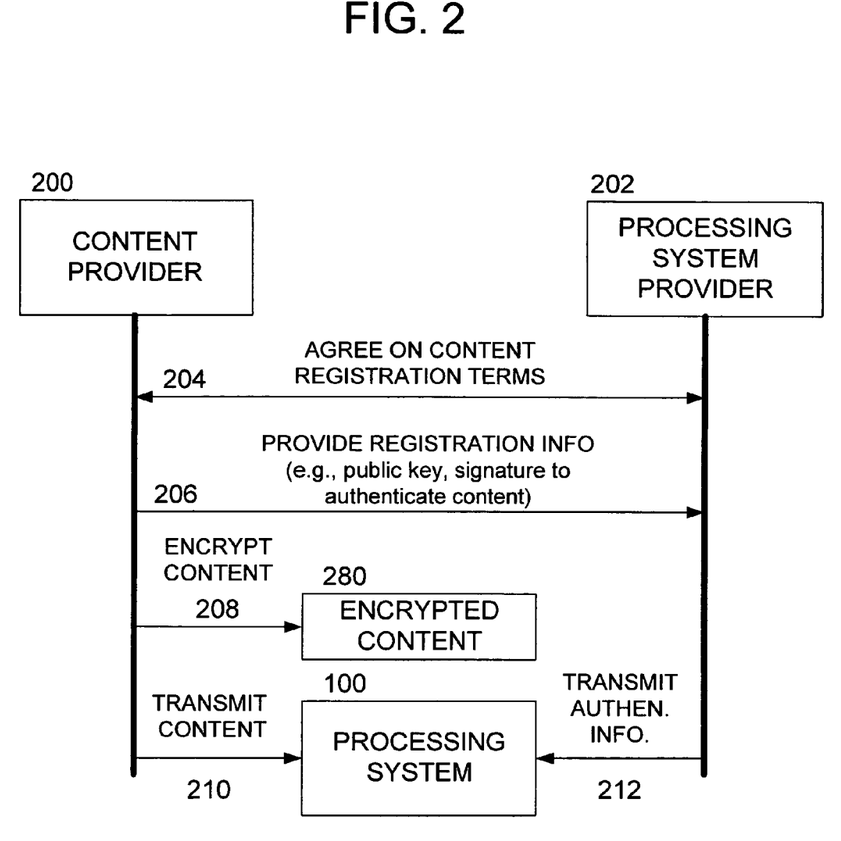
FIG. 2 is a flow diagram illustrating certain actions that may be carried out between a content provider and, for example, a provider of the processing system in accordance with one or more further aspects of the present invention.

In this regard, reference is made to FIG. 2, which is a flow diagram illustrating actions that may be carried out in accordance with one or more aspects of the present invention. For the purposes of illustration, it is assumed that the apparatus 100 is designed and/or manufactured by a processing system provider 202, and that a content provider 200 seeks to have its software executed on the apparatus 100. At action 204, the content provider 200 and processing system provider 202 agree on content registration terms by which the software application (program code and data) produced by the content provider 200 may utilize one or more processing resources 108 of the apparatus 100. The registration terms may take on any number of forms, such as requiring that the content provider supply certain contact information and certifications that the content is free of viruses. Alternatively or in addition, the registration terms may include purchase terms, such as a one-time payment, a royalty-based payment schedule, etc. The registration terms may specify an unlimited usage of the processing resources 108, or the terms may provide for a limited number of usages.

Once the registration terms have been agreed upon, the content provider 200 preferably makes certain information available to the processing system provider 202 (action 206). This information may include, for example, a public key of a private/public key pair that may be used to decrypt the content that is to be provided to the apparatus 100 (and/or the user thereof). The information may also include digital signature information, either by the content provider 200 sending such information to the processing system provider 202 and/or by way of the content provider 200 selecting and/or otherwise specifying desired signature information.

Figure 3:
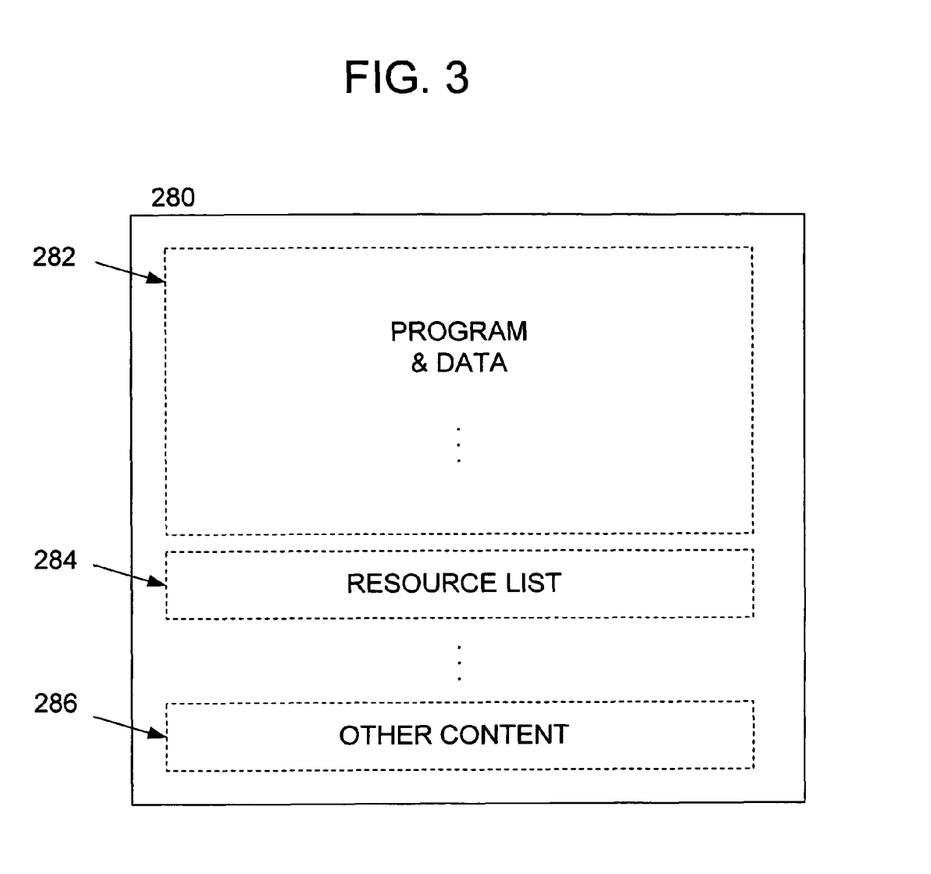
FIG. 3 is a block diagram illustrating certain details of content that may be provided by the content provider for execution by the processing system of FIG. 1 in accordance with one or more aspects of the present invention.

For example, with reference to FIG. 3, the content 280 may include program code and data 282, a resource list 284 (which will be discussed in more detail hereinbelow), and possibly other content 286. The content provider 200 may obtain a digital signature by running a hash algorithm on some portion of the content 280. For example, the hash algorithm may be run on the program code and data 282 alone or in combination with the resource list 284 (if utilized) and/or the other content 286. In any case, a hash result obtained by executing the hash algorithm may be utilized as the digital signature, which may be provided to the processing system provider 202 (action 206, FIG. 2). Turning again to FIG. 2, the processing system provider 202 may specify the particular hash algorithm to be used in producing the digital signature 286. Alternatively, the content provider 200 may select from a list of approved hash algorithms and/or may otherwise specify a desirable hash algorithm to the processing system provider 202.

Actions 204 and 206 represent a registration process between the content provider 200 and the processing system provider 202 in order to permit a software application to utilize one or more resources 108 of the apparatus 100. The particular resources registered for (or purchased) by the content provider 200 may be listed within the resource list 284 and included in the content 280. Alternatively, the list may be omitted, for example, because the registration permits use of all resources. It is noted that the exchange of information between the content provider 200 and the processing system provider 202 may be achieved using any communication means, such as physical delivery, digital transmission, etc.

At action 208, the program code and data 282, the resource list 284, and/or the other content 286 are preferably encrypted utilizing the content provider's private key. At action 210, encrypted content 280 may be transmitted or otherwise provided to a user of the apparatus 100.

The processing system provider 202 preferably utilizes a private key of a private/public key pair to encrypt at least the digital signature (and optionally the content provider's public key). The public key in the pair with the processing system provider's private key is preferably locally stored within the apparatus 100 (e.g., during manufacturing). It is desirable for the processing system provider's public key to be securely stored within the apparatus 100 to prevent tampering therewith. At action 212, the processing system provider 202 preferably transmits the encrypted digital signature and the content provider's public key to the apparatus 100. This transmission may be in response to a request by the user, such as during a registration process when the user invokes the content. Such registration may take place using various techniques, such as by physical registration, digital communication over a network, etc.

Figure 4:
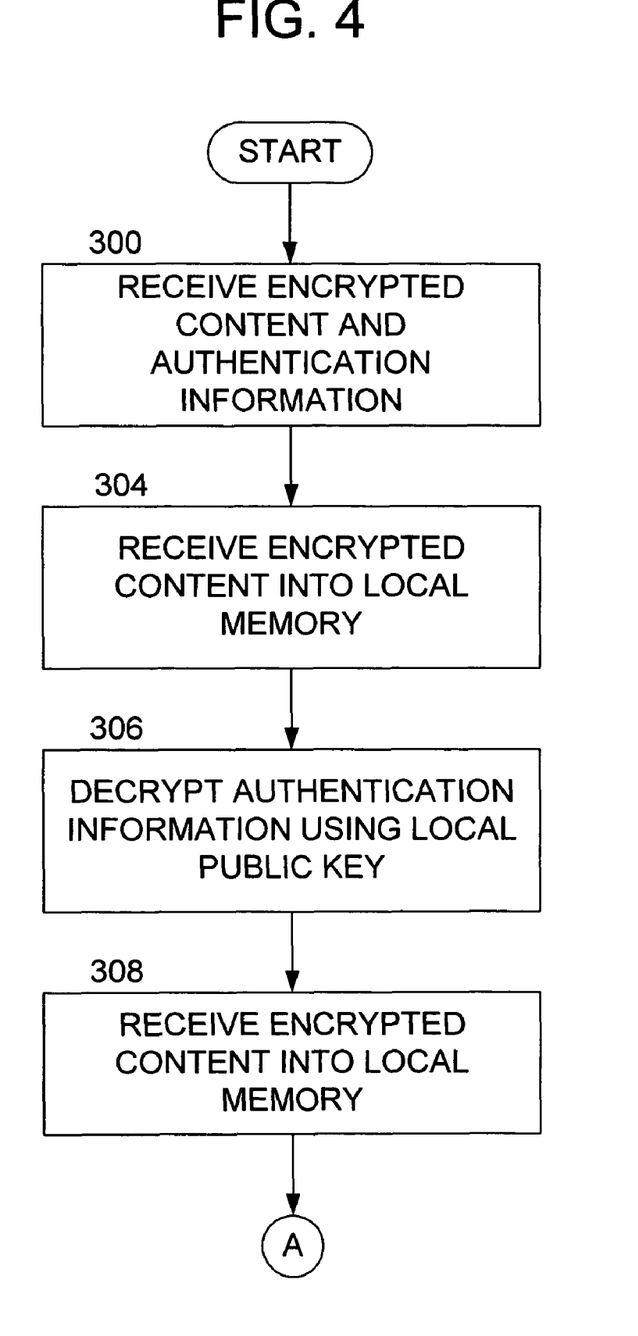
FIG. 4 is a flow diagram illustrating process steps that may be carried out by the processing system of FIG. 1 in accordance with one or more further aspects of the present invention.
Figure 5:
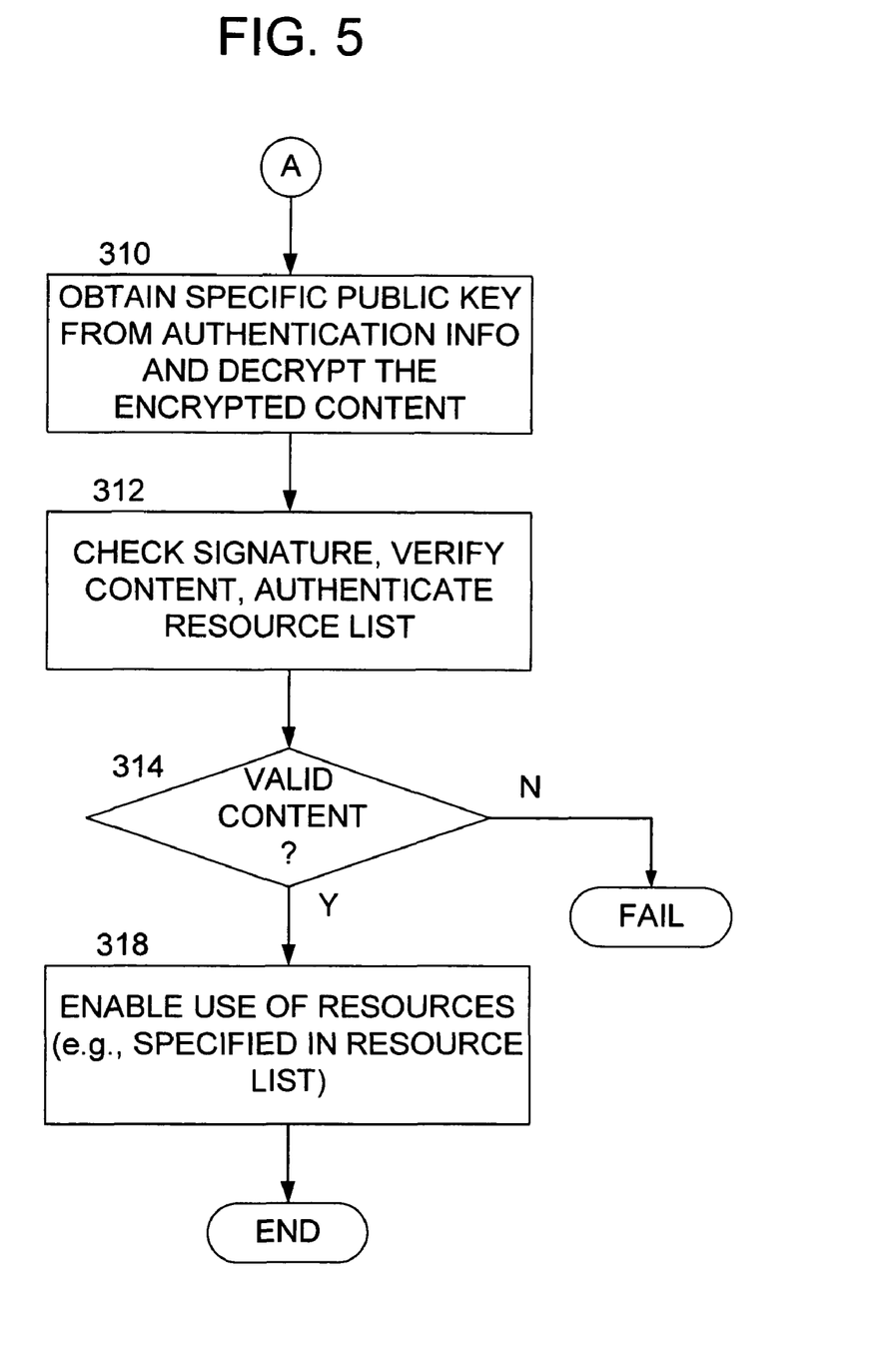
FIG. 5 is a flow diagram illustrating further process steps that may be carried out by the processing system in accordance with one or more further aspects of the present invention.

Reference is now made to FIGS. 4-5, which illustrate further actions that may be carried out in accordance with one or more further aspects of the present invention. At action 300, the encrypted content 280 is received into the system memory 206. This may be achieved in any of the known ways, such as inserting a CD-ROM containing the content into an appropriate reader of the apparatus 100, downloading the content over a network, etc. Also at action 300, and preferably after the encrypted content 280 is received, authentication information is received into the system memory 106. The authentication information preferably includes the content provider's public key (to decrypt the content 280) and the digital signature encrypted with the processing system provider's private key. As with the content 280, the authentication information may be received into the system memory 106 in any of the known ways, such as inserting a storage medium containing the authentication information into an appropriate reader of the apparatus 100, downloading the information over a network, etc.

At action 304, the authentication information is received into the local memory 104. As discussed above, the apparatus 100 preferably includes the processing system provider's public key that corresponds with the processing system provider's private key used to encrypt at least some of the authentication information (e.g., the digital signature). At action 306, the processor 102 preferably decrypts the authentication information in order to obtain the digital signature and the content provider's public key.

Turning to FIG. 5, at action 308, some or all of the encrypted content 280 are preferably received into the local memory 104. At action 301, the content provider's public key (obtained at action 306) is used to decrypt the content 280. It was noted above that the content provider's public key may or may not have been encrypted along with the digital signature. If the content provider's public key was not encrypted, then action 306 need not have been performed in order to decrypt the content 280. Irrespective of the order in which the content 280 and the authentication information are decrypted, the digital signature is utilized to authenticate the content 280 and to enable the program code to use the resources of the apparatus 100.

At action 312, the digital signature is preferably checked to determine its authenticity. For example, if the digital signature is a hash result obtained by running a hash algorithm on at least a portion of the content 280 prior to encryption, then the processor 102 is preferably operable to execute the same hash algorithm on the same portion of the content 280 to produce a second hash result that may be compared with the digital signature. At action 314, a determination is made as to whether the content 280 is valid and should be permitted to utilize one or more of the resources 108 based on whether the digital signature is authentic. If the result of the determination is in the negative, then the process enters a failed state where appropriate action may be taken, such as notifying the user that the content 280 may not be executed, etc. If the result of the determination at action 314 is in the affirmative, then the process flow preferably advances to action 318, where one or more of the resources 108 may be utilized by the program code execution.

In a preferred embodiment, the processor 102 is preferably operable to check the resource list 284 to determine which of the plurality of resources 108 are enabled vis-à-vis the content 280. Thereafter, the specified resources 108 may be utilized in accordance with the agreed upon terms (action 204).

It is noted that in some embodiments of the invention, at least some of the program code may be executed despite the absence of and/or a non-authentic digital signature. Further, in accordance with some aspects of the present invention, the use of at least one of the processing resources 108 may be permitted despite the absence of and/or a non-authentic digital signature. For example, even with no digital signature, various aspects of the present invention may permit use of resources 108A and 108D but prohibit use of resources 108B and 108C.

Figure 6:
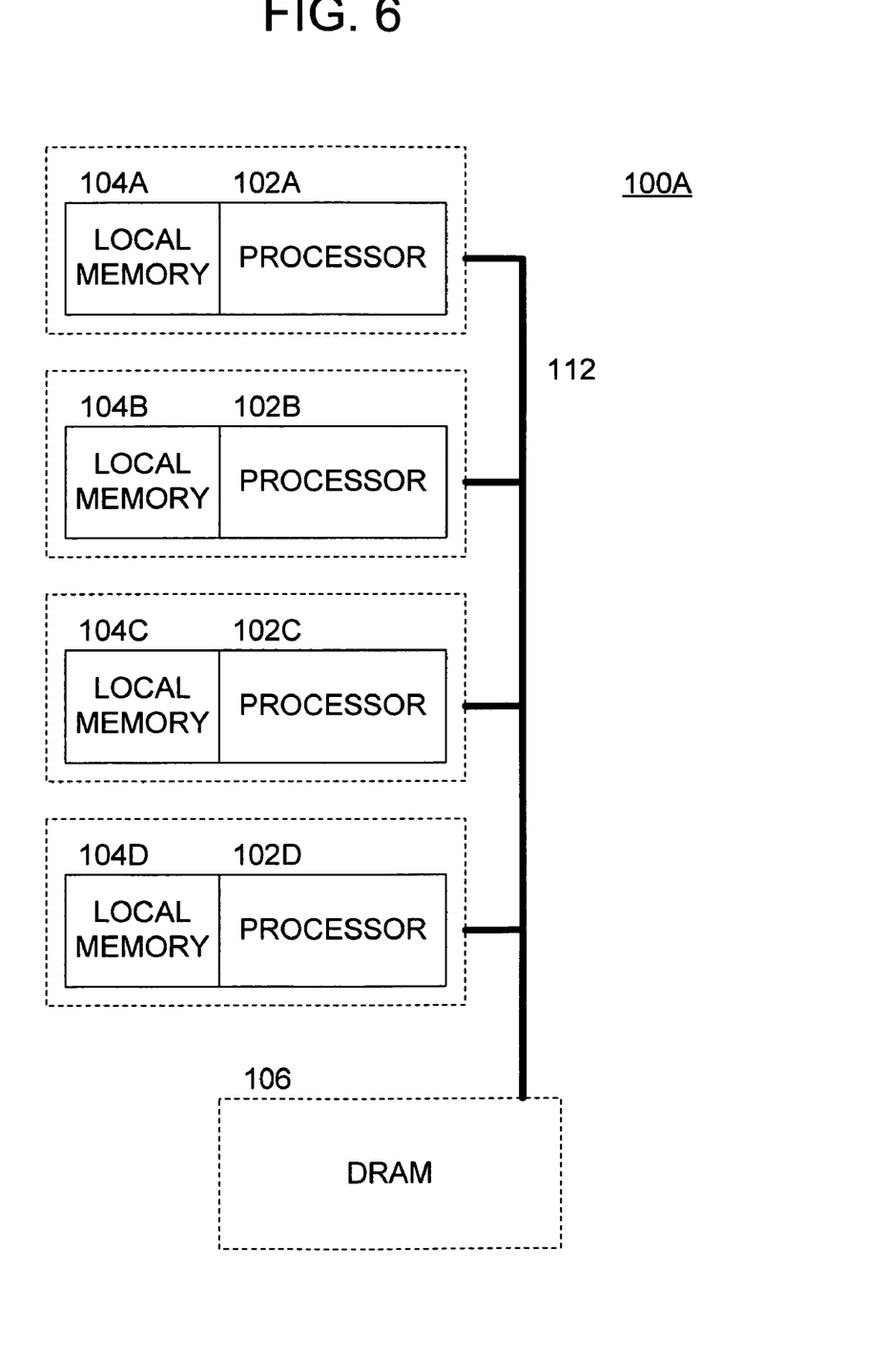
FIG. 6 is a diagram illustrating the structure of a multi-processing system having two or more sub-processors, one or more of which may include the capabilities of the processing system of FIG. 1 in accordance with one or more further aspects of the present invention.

While some processing systems employ a single processor to achieve fast processing speeds, such as that illustrated and described hereinabove with respect to FIG. 1, other processing systems are implemented utilizing multi-processor architectures. With reference to FIG. 6, a multi-processor system 100A is contemplated in which, a plurality of sub-processors can operate in parallel (or at least in concert) to achieve desired processing results. The processing system 100A includes a plurality of processors 102A, 102B, 102C, and 102D, it being understood that any number of processors may be employed without departing from the spirit and scope of the invention. The processing system 100A also includes a plurality of local memories 104A, 104B, 104C, 104D and a shared memory 106. At least the processors 102, the local memories 104, and the shared memory 106 are preferably (directly or indirectly) coupled to one another over a bus system 112 that is operable to transfer data to and from each component in accordance with suitable protocols.

Each of the processors 102 may be of similar construction or of differing construction. The processors may be implemented utilizing any of the known technologies that are capable of requesting data from the shared (or system) memory 106, and manipulating the data to achieve a desirable result. For example, the processors 102 may be implemented using any of the known microprocessors that are capable of executing software and/or firmware, including standard microprocessors, distributed microprocessors, etc. By way of example, one or more of the processors 102 may be a graphics processor that is capable of requesting and manipulating data, such as pixel data, including gray scale information, color information, texture data, polygonal information, video frame information, etc.

One or more of the processors 102 of the system 100A may take on the role as a main (or managing) processor. The main processor may schedule and orchestrate the processing of data by the other processors.

The system memory 106 is preferably a dynamic random access memory (DRAM) coupled to the processors 102 through a memory interface circuit (not shown). Although the system memory 106 is preferably a DRAM, the memory 106 may be implemented using other means, e.g., a static random access memory (SRAM), a magnetic random access memory (MRAM), an optical memory, a holographic memory, etc.

Each processor 102 preferably includes a processor core and an associated one of the local memories 104 in which to execute programs. These components may be integrally disposed on a common semi-conductor substrate or may be separately disposed as may be desired by a designer. The processor core is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processor core may include an instruction buffer, instruction decode circuitry, dependency check circuitry, instruction issue circuitry, and execution stages.

Each local memory 104 is coupled to its associated processor core 102 via a bus and is preferably located on the same chip (same semiconductor substrate) as the processor core. The local memory 104 is preferably not a traditional hardware cache memory in that there are no on-chip or off-chip hardware cache circuits, cache registers, cache memory controllers, etc. to implement a hardware cache memory function. As on chip space is often limited, the size of the local memory may be much smaller than the shared memory 106.

The processors 102 preferably provide data access requests to copy data (which may include program data) from the system memory 106 over the bus system 112 into their respective local memories 104 for program execution and data manipulation. The mechanism for facilitating data access may be implemented utilizing any of the known techniques, for example the direct memory access (DMA) technique. This function is preferably carried out by the memory interface circuit.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

As discussed above, various aspects of the present invention provide for methods and apparatus in which any software requiring use of some or all of the resources of a processing system must have been approved (e.g., by a digital signature) by an entity associated with the processing system (e.g., the designer and/or the manufacturer). Aspects of the invention provide a mechanism that enables the providers of freeware, shareware, and (unlicensed) game content to obtain or validate a digital signature vis-à-vis the designer/manufacturer of the processing system in order to gain access to the resources necessary to execute the content.

The methods and apparatus for managing processing resources in a processing system may achieve the advantages of an open system architecture, the sharing in the rewards of content development and sales by the designer/manufacturer of the processing system, and the benefits of executing shareware and freeware programs on the processing system.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
    requiring that a content provider seeking to have its content executed by a processing system enter into an accord with a processing system provider, who is the designer/manufacturer of the processing system and from whom an end user obtains the processing system;
    receiving a second key and a digital signature from the content provider to the processing system provider, the second key being operable to decrypt the content when it has been encrypted with a first key, and the digital signature indicating that the accord has been reached;
    receiving the encrypted content from the content provider in a memory of the processing system of the end user; and
    preventing use of one or more processing resources of the processing system that are otherwise operable to facilitate the execution of the content unless the digital signature is received by the processing system of the end user from the processing system provider.

2. The method of claim 1, further comprising:
encrypting at least the digital signature using a third key;
ensuring that a fourth key is available to the processing system that is operable to decrypt the digital signature; and
making the second key and encrypted digital signature available to the processing system.

3. The method of claim 2, further comprising:
decrypting at least the encrypted digital signature using the fourth key;
checking authenticity of the digital signature; and
permitting use of the one or more processing resources if the digital signature is authentic.

4. The method of claim 3, wherein: the first key is a private key of a first public/private key pair that controlled by the content provider irrespective of the accord; and the second key is a public key of the first public/private key pair.

5. The method of claim 4, wherein: the third key is a private key of a second public/private key pair that controlled by the processing system provider; and the fourth key is a public key of the second public/private key pair.

6. The method of claim 3, wherein at least one of:
the digital signature is a hash result obtained by running a hash algorithm on at least some of the content;
the content provider makes at least one of the hash result and the hash algorithm known to the processing system provider;
the processing system provider makes the hash algorithm available to the processing system; and
the step of checking the authenticity of the digital signature includes running the hash algorithm on the at least some of the content to obtain a second hash result and comparing the digital signature to the second hash result.

7. The method of claim 1, wherein the content includes a resource list that identifies which of the processing resources are permitted to be used by the content.

8. The method of claim 1, further comprising:
permitting execution of at least some of the content despite the absence of the authorized digital signature; and
permitting use of at least one of the processing resources despite the absence of the authorized digital signature.

9. The method of claim 1, wherein at least one of:
the processing resources include a non-volatile memory sub-system, and one or more functional circuits of the processing system;
the non-volatile memory sub-system includes at least portions of software and/or hardware components of an electromagnetic memory medium, an electronic memory medium, a silicon memory medium, an optical memory medium, a hard disc memory medium, a CD-ROM memory medium, a DVD-ROM memory medium, and an external memory medium; and
the one or more functional circuits of the apparatus includes at least one graphics processing circuit, a network interface circuit, a display interface circuit, a printer interface circuit, and a local data input and/or output interface.

10. The method of claim 1, wherein the content includes at least one of shareware and freeware.

11. A method, comprising:
receiving encrypted content from a content provider in a memory of a processing system that an end user has obtained from a processing system provider, who is the designer/manufacturer of the processing system, the content having been encrypted using a first key, and the content provider having entered into an accord with the processing system provider;
receiving authentication information including a digital signature and a second key from the processing system provider in the memory of the processing system of the end user, at least the digital signature having been encrypted using a third key, the digital signature and the second key having been received by the processing system provider from the content provider, and the digital signature indicating that the accord had been reached;
decrypting the encrypted content using the second key within the processing system of the end user;
decrypting the digital signature using a fourth key stored locally within the processing system of the end user and checking authenticity of the digital signature; and
permitting use of one or more processing resources that are operable to facilitate the execution of the content by a processor of the processing system of the end user only if the digital signature is authentic.

12. The method of claim 11, wherein:
the digital signature is a hash result obtained by running a hash algorithm on at least some of the content prior to receiving the encrypted content; and
the step of checking the authenticity of the digital signature includes running the hash algorithm on the at least some of the decrypted content to obtain a second hash result and comparing the digital signature to the second hash result.

13. The method of claim 11, further comprising:
requiring that a content provider seeking to have its content executed by a processing system enter into an accord with a provider of the processing system;
withholding availability of the digital signature and the second key available to the processing system unless the accord has been reached.

14. The method of claim 13, wherein: the first key is a private key of a first public/private key pair that controlled by a content provider seeking to have the content executed on the processing system; and the second key is a public key of the first public/private key pair.

15. The method of claim 14, wherein: the third key is a private key of a second public/private key pair that controlled by the processing system provider; and the fourth key is a public key of the second public/private key pair.

16. The method of claim 11, wherein the content includes a resource list that identifies which of the processing resources are permitted to be used by the content.

17. The method of claim 11, further comprising:
permitting execution of at least some of the content despite the absence of the authorized digital signature; and
permitting use of at least one of the processing resources despite the absence of the authorized digital signature.

18. The method of claim 11, wherein at least one of:
the processing resources include a non-volatile memory sub-system, and one or more functional circuits of the processing system;
the non-volatile memory sub-system includes at least portions of software and/or hardware components of an electromagnetic memory medium, an electronic memory medium, a silicon memory medium, an optical memory medium, a hard disc memory medium, a CD-ROM memory medium, a DVD-ROM memory medium, and an external memory medium; and
the one or more functional circuits of the apparatus includes at least one graphics processing circuit, a network interface circuit, a display interface circuit, a printer interface circuit, and a local data input and/or output interface.

19. The method of claim 11, wherein the content includes at least one of shareware and freeware.

20. An apparatus including a processing system operable to execute software that causes a processor of the system to execute actions, comprising:
receiving encrypted content from a content provider in a memory of the processing system that has been obtained by an end user from a processing system provider, who is the designer/manufacturer of the processing system, the content having been encrypted using a first key, and the content provider having entered into an accord with the processing system provider;
receiving authentication information including a digital signature and a second key from the processing system provider in the memory of the processing system of the end user, at least the digital signature having been encrypted using a third key, the digital signature and the second key having been received by the processing system provider from the content provider, and the digital signature indicating that the accord had been reached;
decrypting the encrypted content using the second key within the processing system of the end user;
decrypting the digital signature using a fourth key stored locally within the processing system of the end user and checking authenticity of the digital signature; and
permitting use of one or more processing resources that are operable to facilitate the execution of the content by a processor of the processing system of the end user only if the digital signature is authentic.

21. A system, comprising:
a first processing system of a processing system provider and operating to execute software that causes the system to execute actions, including:
receiving a second key and a digital signature from a content provider, the content provider seeking to have its content executed by one or more processing systems provided by the processing system provider, and having been required to enter into an accord with a processing system provider, the second key being operable to decrypt the content when it has been encrypted with a first key, and the digital signature indicating that the accord has been reached,
encrypting at least the digital signature using a third key, and
transmitting the second key and the encrypted digital signature upon request; and
a second processing system that an end user has obtained from the processing system provider, who is the designer/manufacturer of the second processing system, and that operates to execute software that causes a processor of the second processing system to execute actions, including:
receiving the encrypted content from the content provider in a memory of the second processing system, and
preventing use of one or more processing resources of the second processing system that are otherwise operable to facilitate the execution of the content unless the digital signature is received in the second processing system of the end user from the first processing system of the processing system provider.

22. The system of claim 21, wherein the second processing system is further operable to:
request the second key and the encrypted digital signature from the first processing system;
decrypt at least the encrypted digital signature using a locally stored fourth key;
check authenticity of the digital signature; and
permit use of the one or more processing resources if the digital signature is authentic.

23. The system of claim 22, wherein:
the first processing system is further operable to require that the content provider transmit at least one of a hash result and a hash algorithm, the digital signature being the hash result obtained by running the hash algorithm on at least some of the content;
the hash algorithm is available to the second processing system; and
the second processing system is further operable to check the authenticity of the digital signature by running the hash algorithm on the at least some of the content to obtain a second hash result and comparing the digital signature to the second hash result.

24. The system of claim 21, wherein: the first key is a private key of a first public/private key pair that controlled by the content provider irrespective of the accord; and the second key is a public key of the first public/private key pair.

25. The system of claim 24, wherein: the third key is a private key of a second public/private key pair that controlled by the processing system provider; and the fourth key is a public key of the second public/private key pair.

26. The system of claim 21, further comprising:
permitting execution of at least some of the content despite the absence of the authorized digital signature; and
permitting use of at least one of the processing resources despite the absence of the authorized digital signature.

27. The system of claim 21, wherein at least one of:
the processing resources include a non-volatile memory sub-system, and one or more functional circuits of the processing system;
the non-volatile memory sub-system includes at least portions of software and/or hardware components of an electromagnetic memory medium, an electronic memory medium, a silicon memory medium, an optical memory medium, a hard disc memory medium, a CD-ROM memory medium, a DVD-ROM memory medium, and an external memory medium; and
the one or more functional circuits of the apparatus includes at least one graphics processing circuit, a network interface circuit, a display interface circuit, a printer interface circuit, and a local data input and/or output interface.

28. The system of claim 21, wherein the content includes at least one of shareware and freeware.

29. An apparatus that an end user has obtained from a processing system provider, who is the designer/manufacturer of the apparatus, comprising:
a memory for storing: (i) content from a content provider that has been encrypted using a first key, the content provider having entered into an accord with the processing system provider, and (ii) authentication information including a digital signature and a second key that has been obtained by the apparatus of the end user from the processing system provider, at least the digital signature having been encrypted using a third key, the digital signature and the second key having been received by the processing system provider from the content provider, and the digital signature indicating that the accord had been reached; and
a processor operatively coupled to the memory and operating to:
decrypt the encrypted content using the second key,
decrypt the digital signature using a fourth key stored,
check authenticity of the digital signature, and permit use of one or more processing resources that are operable to facilitate the execution of the content only if the digital signature that the apparatus of the end user has obtained from the processing system provider is authentic.

30. The apparatus of claim 29, wherein:
the digital signature is a hash result obtained by running a hash algorithm on at least some of the content prior to receiving the encrypted content; and
the processor is further operable to check the authenticity of the digital signature by running the hash algorithm on the at least some of the decrypted content to obtain a second hash result and comparing the digital signature to the second hash result.

31. The apparatus of claim 29, wherein a content provider seeking to have its content executed by the apparatus must have entered into an accord with a provider of the apparatus in order for the digital signature and the second key to have been received by the apparatus.

32. The apparatus of claim 31, wherein: the first key is a private key of a first public/private key pair that controlled by the content provider; and the second key is a public key of the first public/private key pair.

33. The apparatus of claim 32, wherein: the third key is a private key of a second public/private key pair that controlled by the apparatus provider; and the fourth key is a public key of the second public/private key pair.

34. The apparatus of claim 29, wherein the processor is further operable to:
permit execution of at least some of the content despite the absence of the authorized digital signature; and
permit use of at least one of the processing resources despite the absence of the authorized digital signature.

35. The apparatus of claim 29, wherein at least one of:
the processing resources include a non-volatile memory sub-system, and one or more functional circuits of the processing system;
the non-volatile memory sub-system includes at least portions of software and/or hardware components of an electromagnetic memory medium, an electronic memory medium, a silicon memory medium, an optical memory medium, a hard disc memory medium, a CD-ROM memory medium, a DVD-ROM memory medium, and an external memory medium; and
the one or more functional circuits of the apparatus includes at least one graphics processing circuit, a network interface circuit, a display interface circuit, a printer interface circuit, and a local data input and/or output interface.

36. The apparatus of claim 29, wherein the content includes at least one of shareware and freeware.

37. A storage medium containing a software program, the software program being operable to cause a processor to execute actions including:
receiving encrypted content from a content provider in a memory of a processing system that an end user has obtained from a processing system provider, who is the designer/manufacturer of the processing system, the content having been encrypted using a first key, and the content provider having entered into an accord with the processing system provider;
receiving authentication information including a digital signature and a second key from the processing system provider in the memory of the processing system of the end user, at least the digital signature having been encrypted using a third key, the digital signature and the second key having been received by the processing system provider from the content provider, and the digital signature indicating that the accord had been reached;
decrypting the encrypted content using the second key within the processing system of the end user;
decrypting the digital signature using a fourth key stored locally within the processing system of the end user and checking authenticity of the digital signature; and
permitting use of one or more processing resources that are operable to facilitate the execution of the content by a processor of the processing system of the end user only if the digital signature received by the processing system of the end user from the processing system provider is authentic.

* * * * *